United States Patent
Tillstrom (12)

(10) Patent No.: US 6,817,069 B1
(45) Date of Patent: Nov. 16, 2004

(54) EYEGLASS STRAP RETAINER DEVICE

(76) Inventor: David M. Tillstrom, 330 Chestnut St., Hammonton, NJ (US) 08037

(*) Notice: Subject to any disclaimer, the term of this patent is extended or adjusted under 35 U.S.C. 154(b) by 0 days.

(21) Appl. No.: 10/619,139

(22) Filed: Jul. 14, 2003

(51) Int. Cl.[7] .............................................. A44B 21/00
(52) U.S. Cl. .......................................... 24/3.3; 24/298
(58) Field of Search .......................... 24/3.3, 3.4, 298, 24/300, 301, 302; 351/123, 156, 157, 155; 224/250, 269

(56) References Cited

U.S. PATENT DOCUMENTS

| 3,588,960 | A | * | 6/1971 | McClellan et al. | ............ | 24/3.3 |
| 3,879,804 | A | * | 4/1975 | Lawrence | ...................... | 24/3.4 |
| 4,965,913 | A | * | 10/1990 | Sugarman | ...................... | 24/3.3 |
| 5,092,668 | A | * | 3/1992 | Welch et al. | ................ | 351/157 |
| 5,414,907 | A | * | 5/1995 | Kiapos | .......................... | 24/3.3 |
| 5,465,466 | A | * | 11/1995 | Napier | .......................... | 24/3.3 |
| 5,507,075 | A | | 4/1996 | Tillstrom | ....................... | 24/3.3 |
| 5,600,873 | A | * | 2/1997 | May | .............................. | 24/3.3 |

* cited by examiner

*Primary Examiner*—Robert J. Sandy
(74) *Attorney, Agent, or Firm*—Walter J. Tencza, Jr.

(57) ABSTRACT

An apparatus for connecting a strap to a pair of eyeglasses is disclosed which may include first and second connection devices and first and second springs. Each connection device may have a loop, a first portion, and a second portion. Each loop may be used to attach the respective connection device to a temple leg of a pair of eyeglasses. Each loop may be separate and distinct from the strap. A method is disclosed comprising bending a first portion of the first connection device from an original state so that the first portion of the first connection device can fit into the first spring. The method may also include inserting the first connection device into the first spring, and bending the first portion of the first connection device back to the original state of the first portion so that the first connection device becomes locked onto the first spring.

7 Claims, 3 Drawing Sheets

Fig. 1
Fig. 2
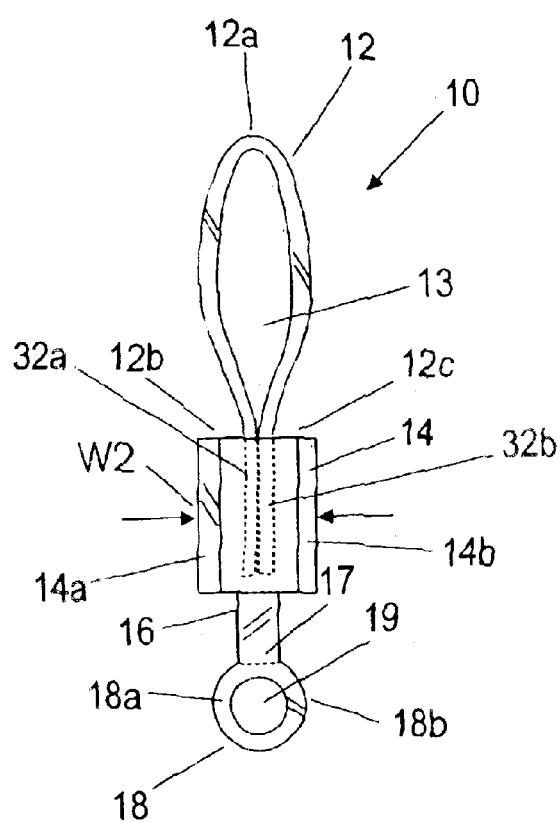
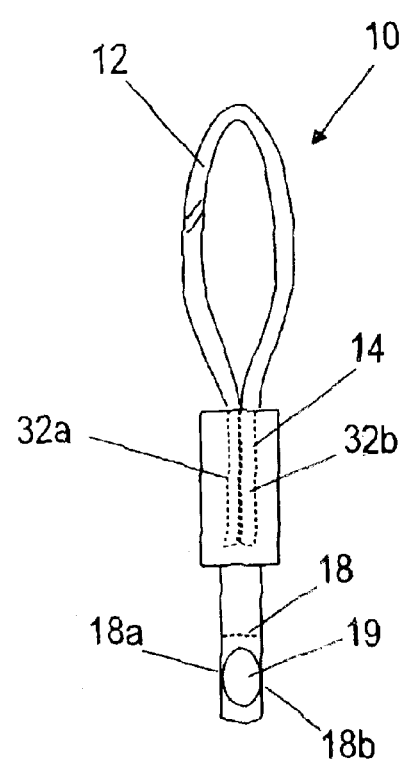

US 6,817,069 B1

EYEGLASS STRAP RETAINER DEVICE

FIELD OF THE INVENTION

This invention relates to improved methods and apparatus concerning straps for eyeglasses.

BACKGROUND OF THE INVENTION

U.S. Pat. No. 5,507,075 to Tillstrom (the applicant of the present application) discloses an eyeglass strap retainer device which includes helical springs 34 and 36 for attaching to temple legs 16 and 18 of eyeglasses 12. (Tillstrom, FIG. 1, col. 3, ln. 47—col. 4, ln. 63). Tillstrom shows a terminal section 26 (in the form of a loop) of a strap 24 for attaching to a temple leg, such as 16. (Tillstrom, FIGS., 1, 2, col. 3, lns. 47–60). U.S. Pat. No. 5,507,075 to Tillstrom is incorporated herein by reference.

SUMMARY OF THE INVENTION

The present invention in one or more embodiments is comprised of an apparatus for connecting a strap to a pair of eyeglasses. The apparatus may include first and second connection devices and first and second springs. Each connection device may have a loop, a first portion, and a second portion. Each first portion may be a metal clasp which secures the loop. Each second portion may be a flat plate which has a hole in it. The first and second ends of a strap can be inserted through the holes in the plate of the second portions of the first and second connection devices, respectively, and thereby attached to the respective connection devices. Each loop may be used to attach the respective connection device to a temple leg of a pair of eyeglasses. Each loop may be separate and distinct from the strap.

The first connection device and the second connection device may have identical structures and the first spring and the second spring may have identical structures. Therefore only the first connection device and the first spring will be described as follows. The first portion of the first connection device may have a width which is less than the inner diameter of a first portion of the first spring. However, the width of the first portion of the first connection device may have a width which is greater than the inner diameter of a second portion of the first spring, so that the first portion of the first connection device cannot be inserted into the second portion of the first spring. The first spring may have a helical shape.

In at least one embodiment of the present invention, the second portion of the first connection device can only fit inside the second portion of the first spring when the second portion of the first connection device is bent from an original state to an altered state. In addition, the second portion of the first connection device can be bent back to its original state to lock the first connection device onto the first spring.

The present invention in one or more embodiments also comprises a method comprising bending a portion of a first connection device from an original state so that the portion of the first connection device can fit into a first spring. The method may also include inserting the first connection device into the first spring, and bending the portion of the first connection device back to its original state so that the first connection device becomes locked onto the first spring. The method may further include attaching the first connection device to a first temple leg of a pair of eyeglasses, and inserting a first end of a strap through an opening of the portion of the first connection device.

BRIEF DESCRIPTION OF THE DRAWINGS

FIG. 1 shows a front view of a first connection device in accordance with a first embodiment of the present invention;

FIG. 2 shows a front view of the first connection device of FIG. 1, with a portion of the first connection device folded over or bent;

DETAILED DESCRIPTION OF THE DRAWINGS

Figure 3:
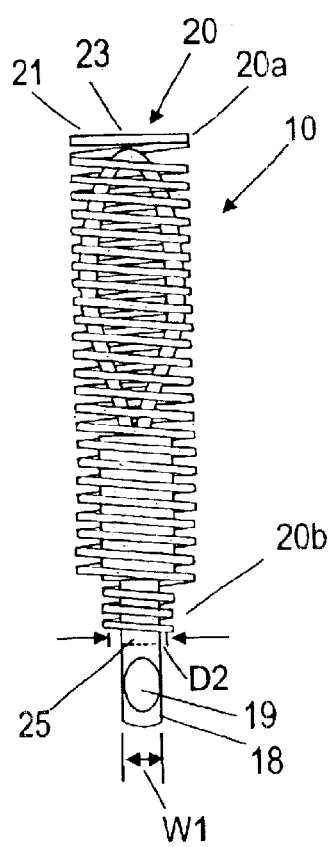
FIG. 3 shows a front view of the first connection device of FIG. 1 inserted into a first spring, with a portion of the first connection device folded over or bent as in FIG. 2.

The term "strap" is used generally to describe as an elongate member, which may or may not be flexible, and which can hang around a wearer's neck with first and second ends of the strap attached to first and second connection devices in accordance with the present invention. The term "strap" may include a plastic or leather strap, a woven cord or ribbon, a metal, common or precious chain, a flexible spring, or any other equivalent structure suitable for use.

FIG. 1 shows a front view of a first connection device 10 in accordance with a first embodiment of the present invention. The first connection device 10 is comprised of a loop 12, a portion 14, a portion 16 and a portion 18. The loop 12 may be an elastic cord. A portion of the loop 12 is shown in dashed lines in FIGS. 1 and 2, to show that it lies underneath portion 14 in FIG. 1 and is held within a folded over version of portion 14 in FIG. 2. The loop 12 may have a top portion 12a and may be fixed to the portion 14 at ends 12b and 12c. The portion 14 may be a metal clasp which is fixed to the loop ends 12b and 12c. The portion 16 may be an extension or protrusion which is part of or fixed to the portion 14. The portion 18 may be an extension or protrusion which is part of or fixed to the portion 14. The dashed line 17 is merely used for descriptive purposes to show the division between portion 16 and portion 18. The portion 18 may be called an eyepiece. The portion 18 may have an opening or hole 19. The portion 18 may be comprised of portions 18a and 18b. The portion 18 may be a flat metallic plate with the exception of opening 19. The portion 16 may be a flat metallic plate which may be integrated with portion 18. The portion 14 may be a metal clasp in which ends 32a and 32b of the loop 12 are located as shown in FIG. 2.

FIG. 2 shows a front view of the first connection device 10 of FIG. 1, with the portions 18a and 18b of the first connection device 10 folded over or bent and parts 14a and 14b are folded over or bent to retain loop 12. Ends 32a and 32b of the loop 12, shown by dashed lines in FIG. 2, are held within portion or clip 14. The portions 18a and 18b are folded over or bent in order to allow the portion 18 to be inserted into a first spring 20 shown in FIG. 3.

FIG. 3 shows a front view of the first connection device 10 of FIG. 1, inserted into the first spring 20. The first connection device 10 is inserted into the first spring 20 by first inserting the portion 18 into an opening 21, shown in FIGS. 3 and 7, at the top of the spring 20. The spring 20 is a spiral or helical type spring and has a central hollow axis or chamber 23 into which the first connection device 10 can be inserted, as shown by FIGS. 3 and 7.

Figure 7:
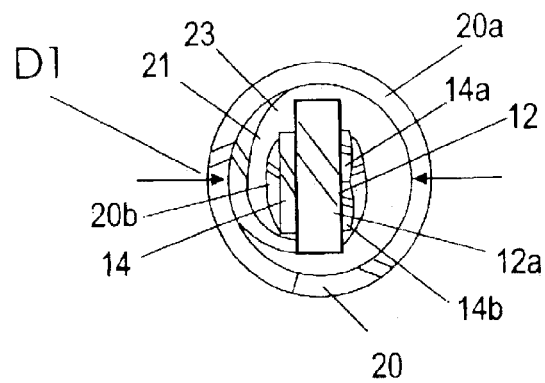
FIG. 7 shows a top view of the first connection device.

The spring 20 has a plurality of windings 20a having an internal diameter of D1 shown in FIG. 7, and a plurality of internal windings 20b having an internal diameter of D2 shown in FIG. 3, wherein D2 is smaller than D1. The internal diameter D2 of the windings 20b is small enough so that only portion 16 and portion 18 when portions 18a and 18b have been folded or bent back, of the first connection device 10 can fit inside the windings 20b as shown in FIG. 3. The portion 16 and the portion 18, when the portions 18a and 18b have been bent or folded back as in FIG. 3, may have a width W1 which is small enough so that the portions 16 and 18 can fit inside the windings 20b. The portion 14 may have a width W2, shown in FIG. 1, which is larger than the internal diameter D2 of the windings 20b. The dimensions of the windings 20b and the portion 14 help to prevent the first connection device 10 from coming out of the spring 10 through a bottom opening 25 shown in FIG. 3, of the spring 10.

Figure 4:
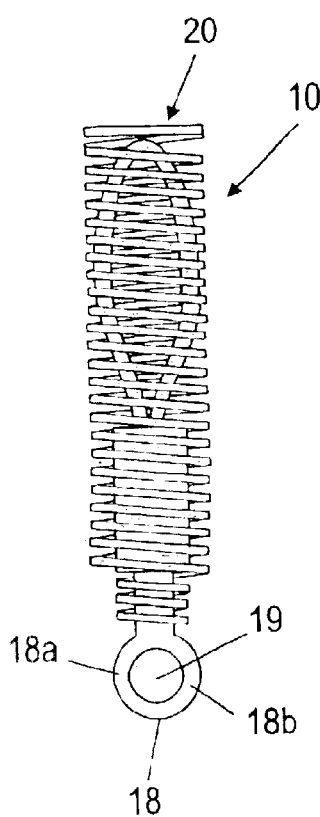
FIG. 4 shows a front view of the first connection device of FIG. 1, with a portion of the first connection device folded or bent back to its state of FIG. 1.

FIG. 4 shows a front view of the first connection device 10 of FIG. 1, with the portions 18a and 18b of the first connection device 18 folded or bent back to the original state of FIG. 1. After the portion 18 of the connection device 10 has been inserted into the top opening 21 of the spring 20, and after the portion 18 has gone through the windings 20a, through the windings 20b, then through the bottom opening or end 25, the portions 18a and 18b are bent or folded back into their original state of FIG. 1, in order to lock the first connection device 10 into the spring 20. In FIG. 4, the first connection device 10 cannot be pulled out through the end or opening 21 or through the end or opening 25, at least not without bending the portions 18a and 18b.

Figure 5:
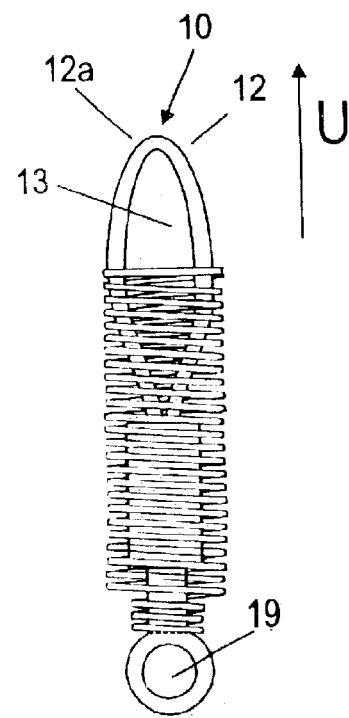
FIG. 5 shows a front view of the first connection device of FIG. 1 with the first spring shown in a compressed state.

FIG. 5 shows a front view of the first connection device 10 of FIG. 1 with the first spring 20 shown in a compressed state. The spring 20 is compressed and the elastic, loop 12 is pulled out in the direction U, in order to make the loop 12 accessible and in order to attach the loop 12 to a temple leg of a pair of eyeglasses.

Figure 6:
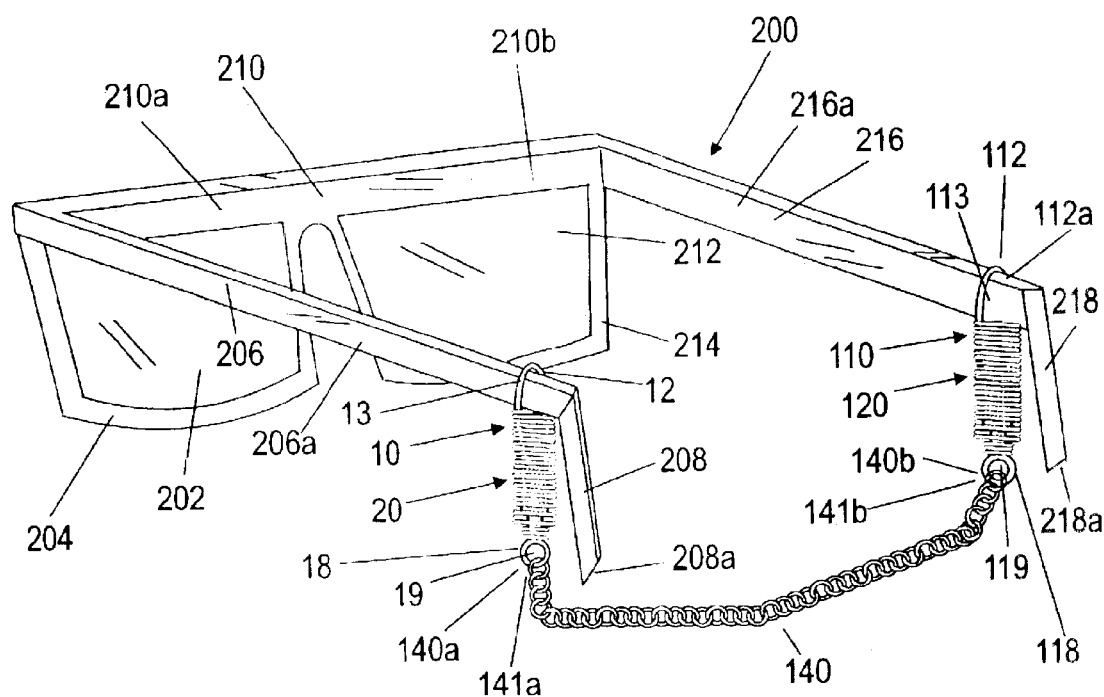
FIG. 6 shows a perspective view of the first connection device and a second connection connected to temple legs of a pair of eyeglasses, with the first and second connection devices connected to each other by a strap.

FIG. 6 shows a perspective view of the first connection device 10 and a second connection device 110 connected to a first temple leg 206 and a second temple leg 216, respectively, of a pair of eyeglasses 200. The pair of eyeglasses 200 may include a central frame 210 including left portion 210a and right portion 210b. The left portion 210a is connected to a frame portion 204 which retains a lens 202. The right portion 210b is connected to a frame portion 214 which retains a lens 212. The first and second temple legs 206 and 216 of the eyeglasses 200 include horizontal members 206a and 216a, respectively, which are connected substantially perpendicularly to vertical extensions 208 and 218 respectively. The extensions 208 and 218 have ends 208a and 218a, respectively.

The second connection device 110 may have the same structure as the first connection device 10. The second connection device 110 may include a loop 112. The second connection device 110 may be inserted into a spring 120 which have the same structure as the spring 20. The first connection device 10 may be connected at portion 18 through opening 19 to a first end 140a of a strap 140. The strap 140 may be a chain comprised of a plurality of links, such as link 141a connected to portion 18 of the first connection device 10 and link 141b connected to portion 118 of the second connection device 110. The chain 140 may be replaced by an elastic cord which may connect the first connection device 10 to the second connection device 110.

The first connection device 10 may be connected to the temple leg 206 by inserting an end 208a of an extension 208 of the eyeglasses 200 through the opening 13 of the loop 12 when the spring 20 is compressed and/or the loop 12 pulled outwards, i.e. when the first connection device 10 is in the state of FIG. 5. Similarly, the second connection device 20 may be connected to the temple leg 216 by inserting an end 218a of an extension 218 through the opening 113 of the loop 112 when the spring 120 is compressed and/or the loop 112 pulled outwards, i.e. when the second connection device 110 is in a state corresponding to the state of first connection device 10 shown in FIG. 5.

FIG. 7 shows a top view of the first connection device 10.

The loop 12 may be a piece of braid. The portion 14 may be a flat clip which can be placed over the double portion, i.e. ends 32a and 32b, in FIG. 1 and then bent over to retain the ends 32a and 32b.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus for connecting a strap to a pair of eyeglasses comprising:
   a first connection device comprising
      a loop;
      a first portion connected to the loop, the first portion having a first width;
      a second portion connected to the first portion, the second portion having a second width which is less than the first width, the second portion also having a hole;
   a first spring having
      a helical shape, the first spring
      having a first portion with a first diameter which is greater than the first width of the first portion of the first connection device, so that the first portion of the first connection device can fit inside the first portion of the first spring; and the first spring further
      having a second portion having a second diameter which is less than the first width of the first portion of the first connection device, so that the first portion of the first connection device cannot fit inside the second portion of the first spring; and
   wherein a first end of the strap can be inserted into the hole of the second portion of the first connection device to connect the strap to the first connection device; and
   wherein the loop of the first connection device is separate and distinct from the strap.

2. The apparatus of claim 1 further comprising
   a second connection device comprising
      a loop;
      a first portion connected to the loop of the second connection device, the first portion of the second connection device having a first width;
      a second portion connected to the first portion of the second connection device, the second portion of the second connection device having a second width which is less than the first width of the second connection device, the second portion of the second connection device also having a hole;
   a second spring having a helical shape, the second spring
having a first portion with a first diameter which is greater than a first width of the first portion of the second connection device, so that the first portion of the second connection device can fit inside the first portion of the second spring; and the second spring further
having a second portion having a second diameter which is less than the first width of the first portion of the second connection device, so that the first portion of the second connection device cannot fit inside the second portion of the second spring;
wherein a second end of the strap can be inserted into the hole of the second portion of the second connection device;
and wherein the loop of the second connection device is separate and distinct from the strap.

3. The apparatus of claim 1 wherein
the second portion of the first connection device can only fit inside the second portion of the first spring when the second portion of the first connection device is bent.

4. The apparatus of claim 2 wherein
the second portion of the first connection device can only fit inside the second portion of the first spring when the second portion of the first connection device is bent, and
the second portion of the second connection device can only fit inside the second portion of the first spring when the second portion of the first connection device is bent.

5. The apparatus of claim 3 wherein
the second portion of the first connection device can be bent from its original state to allow the second portion of the first connection device to be inserted into the second portion of the first spring; and
and wherein the second portion of the first connection device can be bent back to its original state to lock the first connection device onto the first spring.

6. The apparatus of claim 4 wherein
the second portion of the first connection device can be bent from its original state to allow the second portion of the first connection device to be inserted into the second portion of the first spring; and
and wherein the second portion of the first connection device can be bent back to its original state to lock the first connection device onto the first spring, and
the second portion of the second connection device can be bent from its original state to allow the second portion of the second connection device to be inserted into the second portion of the second spring; and
and wherein the second portion of the second connection device can be bent back to its original state to lock the second connection device onto the first spring.

7. The apparatus of claim 1 wherein
the first portion of the first connection device is a metal clasp; and
the second portion of the first connection device is a metal plate.

\* \* \* \* \*